United States Patent [19]
Rebosio

[11] 3,971,128
[45] July 27, 1976

[54] METHOD FOR MAKING INSULATORS AND INSULATORS THUS OBTAINED

[76] Inventor: Sergio Rebosio, Via Mantegna, 82, 20096 Pioltello (Milan), Italy

[22] Filed: Mar. 3, 1975

[21] Appl. No.: 555,176

[30] Foreign Application Priority Data
Mar. 9, 1974 Italy .................................. 86230/74

[52] U.S. Cl. .............................. 29/631; 174/178; 264/249; 264/263; 403/268
[51] Int. Cl.² ........................................ H01B 19/00
[58] Field of Search ............. 29/631, 460; 174/178, 174/179, 180, 177, 176; 264/249, 261, 263, 264, 250; 156/166, 282, 296; 403/265, 267, 268, 269

[56] References Cited
UNITED STATES PATENTS

| | | | |
|---|---|---|---|
| 3,134,164 | 5/1964 | Hocks ................................. | 29/631 |
| 3,226,805 | 1/1966 | Scott et al ............................ | 29/631 |
| 3,461,539 | 8/1969 | Napple ........................... | 403/267 X |
| 3,557,447 | 1/1971 | Gruber et al ......................... | 29/631 |
| 3,567,541 | 3/1971 | Kaczerginski ................... | 174/177 X |
| 3,660,887 | 5/1972 | Davis ................................... | 29/460 |
| 3,739,457 | 6/1973 | Davis ................................... | 29/460 |

*Primary Examiner*—C.W. Lanham
*Assistant Examiner*—James R. Duzan
*Attorney, Agent, or Firm*—Clarence A. O'Brien; Harvey B. Jacobson

[57] ABSTRACT

A method for making insulators, comprising the steps of forming a bar from a fiber glass mass impregnated with a thermosetting resin, carrying out the complete polymerization or curing substantially for the major portion of the bar length and maintaining at least one end thereof cooled at a lower temperature than the complete polymerization or curing temperature for said resin. The bar so formed is inserted in an insulating covering and a terminal fitting is applied to said uncured end of the bar, widening the fiber glasses of the uncured end of the bar against a divergent or flared surface of the terminal, and a successive step of complete polymerization or curing is carried out for said bar.

5 Claims, 7 Drawing Figures

METHOD FOR MAKING INSULATORS AND INSULATORS THUS OBTAINED

This invention relates to a method for making insulators substantially comprising a bar of resin reinforced with fiber glasses, inserted in a covering of electrically insulating material and provided with anchoring terminals or end fittings.

Particularly, the invention aims to a process for making resin bars or sections reinforced with fiber glasses, which are subjected to successive polymerizing steps to enable, after the bars have been introduced into the outer coverings of organic material, the coupling thereof with metal terminals for insulator completion.

The invention is also concerned with the insulators as obtained according to the method being claimed.

The principles are known according to which the insulators of the above mentioned design are made. One of the most important problems resides in the coupling between the metal terminals and insulating elements, particularly because of the ultimate tensile stresses resulting from the strains said insulating elements undergo under the load conditions due to weight, winds, formation of ice muffs, curve pulls along electric lines and the like.

When using cylindrical bars for making insulators, the coupling with cylindrical terminals is quite uncertain, since the mechanical strength being provided is proportional to the radial reaction being built up between the metal terminal and the bars, after compression of said terminal, to the friction coefficient of the two elements, and to the compression length.

Where high loads are concerned, it is therefore necessary to provide bars with conical ends, on which metal terminals having a seat with a similarly conical surface are compressed.

With known construction systems, the bars are already pre-formed with both conical ends, whereupon the latter are introduced into such an insulating covering as to bear the electrical stresses.

Therefore, it is apparent that the internal size of the covering should be such as to allow the introduction of the enlarged ends of the bar.

In insulator production, since a monolithic unit is to be made, the gap or annular chamber being thus provided between the external covering and the resin bar reinforced with fiber glasses, should be filled up with a suitable dielectric material in order to provide for glueing and a connection between said bar and covering.

For large size insulators of a substantial length, wherein the amount of material to be cast is considerable, difficulties would arise in the process for casting this material, since the resin cast should be such that, in addition to assuring a full glueing as above mentioned, this cast should be homogeneous, free of defects and flaws.

It should also be taken into account that during operation these members are subjected to heat or tension changes, such as to induce stresses in the layer of filler material cast or poured between the internal bar and the external covering; it has been found that less is the thickness of material between the bar and covering and better are the efficiency conditions of the insulator. Thus, it is required to minimize the thickness of this filler material layer.

Therefore, the general object of the present invention is to provide a method for obtaining insulators of the above mentioned character. Particularly, the invention relates to a method for making insulators provided with bars having conical ends, so as to assure a resistance capability to the highest ultimate tensile stresses and supposing that a minimum layer of resin or other filler material is provided between said bar and the electrically insulating external covering of the insulator.

Generally, the principle on which the present invention is grounded consists of forming the bar with a constant section throughout its length from one end, or the two ends, and without any polymerization at said end or ends, in order to introduce said bars into a covering of insulating material, successively apply the metal terminal, enlarge said end bringing the fibers against a frusto-conical surface of the metal terminal, such as by introducing wedges and completing the curing or polymerization of the bar end; the size of the inner bar body can be maintained, reducing as a result the size of the covering and hence the amount of filling material to be cast or poured.

This step of successive polymerization for one or both ends of the bar can be carried out as, during the polymerization process for the central portion of the bar, the end or ends are cooled in order to remove heat and not to initiate the polymerization step at said end or ends.

The method for making insulators according to the invention can be accomplished either according to a batch cycle or according to a continuous cycle, as described hereinafter with reference by way of example to the accompanying drawings, in which:

FIG. 1 is a diagram of a continuous cycle system for producing resin bars reinforced with fiber glasses to provide insulators according to the method of the invention;

FIG. 2 schematically shows a second embodiment for providing in a batch cycle a bar for obtaining insulators according to the invention;

Figure 1:
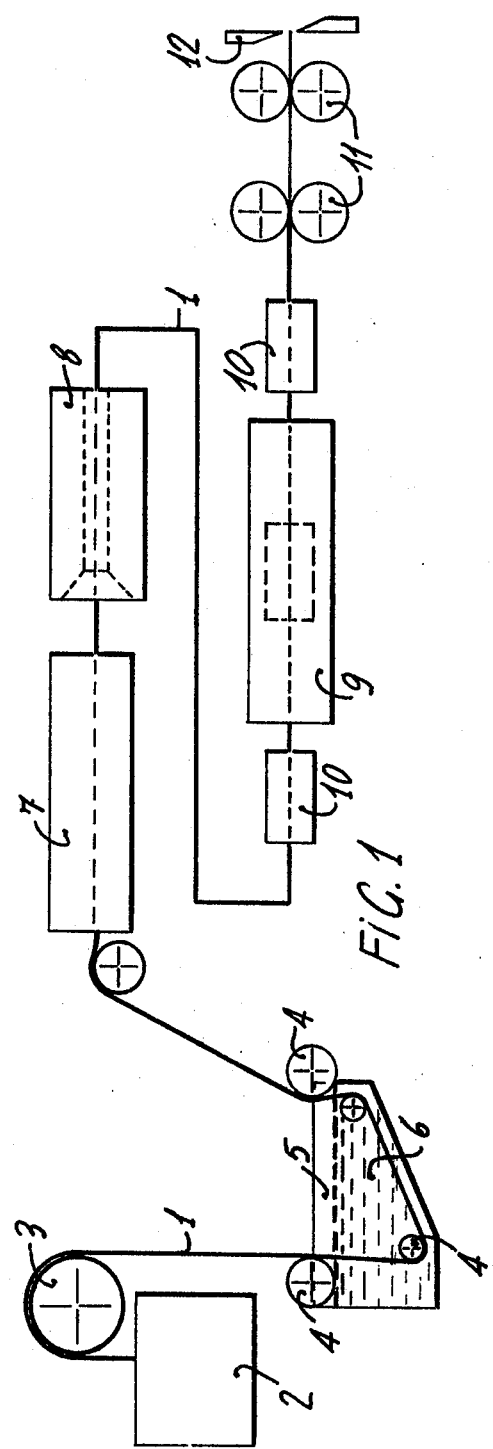
FIG. 1 shows the diagram of a system for producing bars in a continuous cycle with "delayed" polymerization of the ends to provide insulators according to the method of the invention.

In FIG. 1, a web 1 of continuous filaments, such as fiber glasses, is unwound from a skein 2 and, guided by suitable rollers 3, 4, is immersed in a reservoir 5 for impregnation with a thermosetting resin 6 contained in said reservoir, such as a polyester resin or an epoxy resin. The fiber glass web 1 is then subjected to a resin gelling process, by causing it to pass through a continuous oven 7, in which it is maintained at a gelling temperature, such as 80°C for polyester resin or 90°C for epoxy resin; on emerging from the oven 7, the fiber web with the gelled resin is caused to pass through an extruder 8 in series with a successive continuous polymerization oven 9, through which the drawn fiber web is passed. Prior to passing through the polymerization oven 9, cooling elements 10 are placed at predetermined intervals on the fiber-impregnated web 1, these cooling elements 10 moving along with the web 1 internally and longitudinally of the polymerization oven 9 for retaining the section thereby protected of the resin-impregnated fiber web constantly cooled at a temperature below the curing temperature of the resin. For example, such cooling elements could comprise muffs or sleeves of refractary material, in which a suitable circulation of refrigerating water is maintained. The spacing at which said cooling elements 10 are placed, as measured between the center distances thereof, should be the same as the length of the bars to be obtained.

At the outlet of the polymerization or curing oven 9, the cooling elements 10 are removed and the fiber web in the form of a continuous bar is moved forward by the drawing rollers 11 to a cutting device 12, where the bar is cut to lengths corresponding to the uncured sections. Therefore, these bar sections will have a central cured portion and uncured end portions or cured to a lower degree.

Therefore, the bars so obtained have substantially a constant section throughout the length thereof, so that they can be readily introduced into an electrically insulating external covering or coating, having substantially the same size, or slightly greater than that of the bar; this enables to minimize the spacing or distance between the parts and thus the amount of filling resin which is to be successively poured.

As above mentioned, the fibers comprising the resistant structure of the resin bar are provided from continuous filaments, such as glass or other material, so as to be arranged parallely to and longitudinally of the bar; the longitudinal arrangement of the fiber glasses allows to provide a maximum preferential strength to the action of the axial loads. As to the resin used for impregnating the fiber web, a polyester resin can be used, such as "Neoxil 709" available from Savid, which needs only a heat polymerization or curing cycle for about one hour and a half at 120°C, or an epoxy resin, such as "XB 2649" available from Ciba, for which a heat polymerization or curing cycle for one hour and a half at about 150°C is required.

Figure 2:
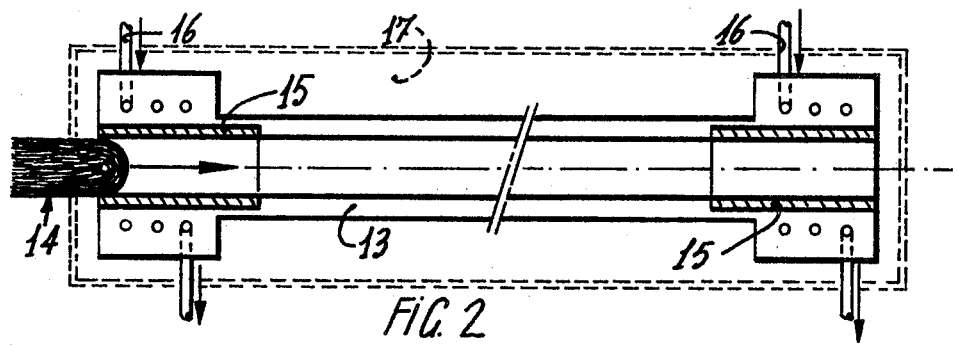
Figure 3:
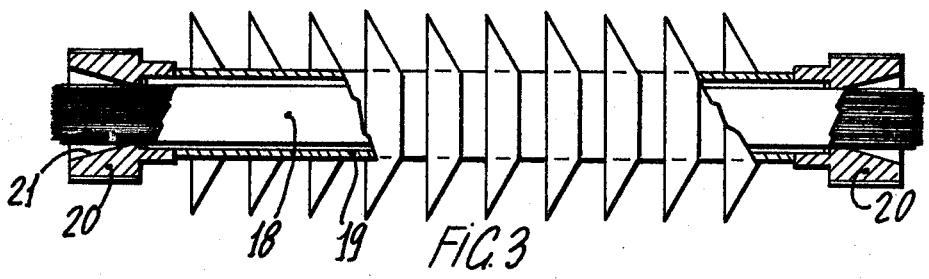
FIG. 3 shows the step when a bar, as provided by the system shown in FIG. 2, is introduced into an external covering and the metal terminals are applied.

Referring now to FIG. 2, a second embodiment of batch type for providing bars in the production of insulators according to the invention will be described.

FIG. 2 shows an openable type of die 13, in which a mass 14 of fiber glasses impregnated with a thermosetting resin is introduced. At the two ends, said die 13 has a housing for two sleeves or muffs of refractory material 15, the inner diameter of which corresponds to the inner diameter of said die 13. At the die ends, a conduit 16 is also formed for cooling water circulation serving to maintain the ends of the fiber glass mass and hence the bar to be formed at such a temperature that resin polymerization or curing is avoided. Thus, when the fiber glass mass impregnated with resin has been closed in die 13, the latter is placed in a polymerization or curing oven 17, schematically outlined in FIG. 2, where a heating occurs to a polymerization or curing temperature for the resin. Concurrently thereto and during the entire polimerization period, the die ends are cooled by a water circulation through the conduits 16 in order to maintain the ends of the fiber glass mass impregnated with resin, that is the bar being formed, suitably cooled below the polymerization or curing temperature.

Figure 4:
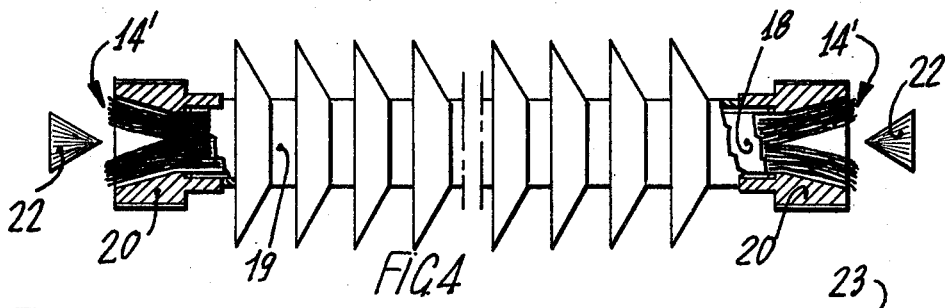
FIG. 4 shows the enlargement operation for the not polymerized ends of the bar against frusto-conical surfaces of the end terminals or anchoring fittings.

Upon completion of resin curing at the central portion of the bar, ends excluded, the bar, designated at 18 in FIG. 4, is inserted in an external coating 19 of electrically insulating material, such as PTFE, capable of withstanding the electrical stresses.

Since the bar 18 has a substantially constant section throughout its length, its introduction into the above mentioned external coating 19 is thus facilitated; therefore, this coating can have a same or slightly greater inner size over the outer size of bar 18.

When the bar 18 has been inserted in the external covering 19, the anchoring metal terminals 20 are applied to the two ends of the bar and will serve for anchoring the insulators.

As clearly shown in FIG. 4, each of the metal terminals has a through hole defining a seat with a divergent or conically shaped surface 21, having the cone apex coaxial with said bar 18.

After application of the metal terminals 20, the fiber glasses 14' at the two uncured ends of the bar 18, are suitably widened by causing them to bear against the conical surface 21 of each of the above mentioned terminals 20. Upon widening of fibers 14', introduction is then provided for wedge-like elements, such as cones 22, suitably preformed of organic and inorganic material, such as nylon, and/or preferably such as aluminum and steel. These cones are of such a shape as to retain substantially constant the resistant section of the bar at its ends.

Figure 5:
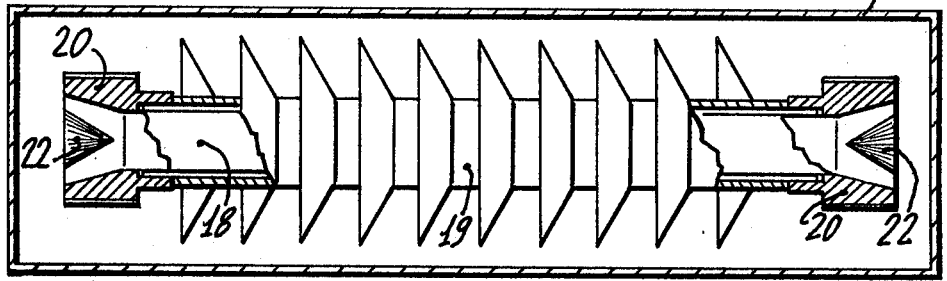
FIG. 5 shows the polymerization step for the ends of the bar with terminals applied and inserted in the external covering.

After having introduced said cones 22, the assembly comprising the forming insulator, is placed again in a polymerization or curing oven 23 (FIG. 5), where the polymerization is completed for the ends of bar 18 which, therefore, is firmly anchored to the metal terminals 20.

Figure 6:
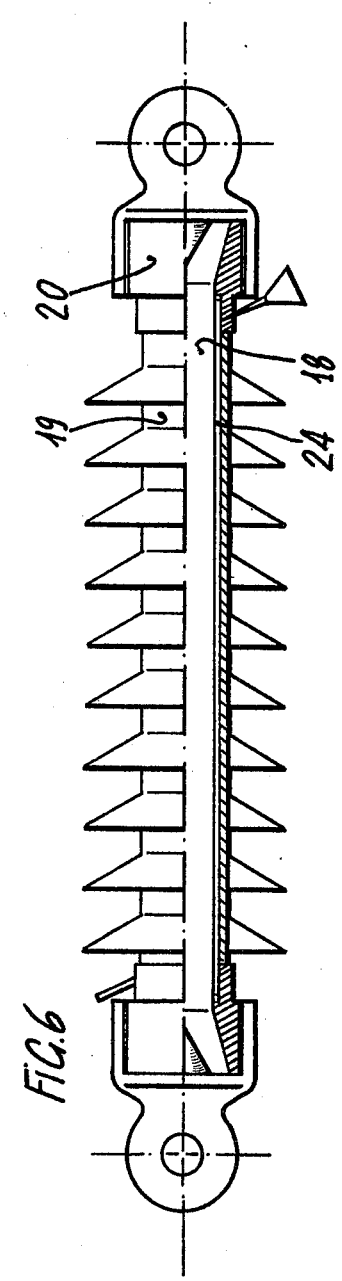
FIG. 6 shows the final stage of the insulator formation, in which a filling and glueing material is poured between the internal bar and the external covering.

The insulator assembly is held in the polimerization or curing oven 23 for a time sufficient to cause a complete polymerization or curing of the bar end, whereupon the insulator forming process is completed, as shown in FIG. 6, by a vacuum impregnation operation to completely fill up the space 24 being provided between the surface of bar 18 and the inner surface of covering 19. This filling is carried out with a suitable impregnating material or resin, capable of allowing a perfect glueing between the bar 18 and the inner surface of the coating 19, such as "Epikote 815" resin available from Shell Co.

Upon completion of impregnation and polymerization or curing of the impregnating resin, the insulator is thus completed.

Figure 7:
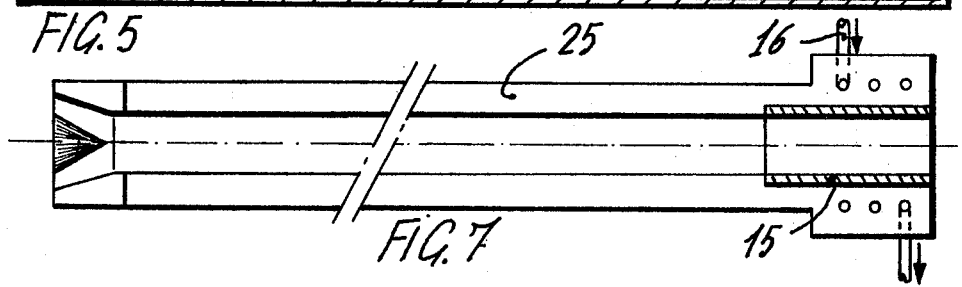
FIG. 7 is a view showing a modified embodiment for the system shown in FIG. 2.

Referring to FIG. 7, a variant to the bar forming process will be briefly described.

In the case of the embodiment shown in FIG. 7, there is provided a die 25 which is modified at one end relative to the die 13 shown in FIG. 2.

Thus, the die 25 of FIG. 7 has the cooling water circulation conduit 16 at only one end, while at the opposite end the die cavity is outwardly divergent or flared. Thus, the formation is provided for resin bars reinforced with fibers, one end of which already has a conical surface configurated to accommodate the corresponding conical inner surface 21 of a metal terminal 20; the other uncured end of the bar will be differently processed, as previously set forth. More particularly, upon provision of a bar having the above mentioned shape, this bar will be slipped through a terminal and the external covering, whereupon the other end terminal will be applied, the fibers being widened against the conical surface thereof to insert a cone 22, this being followed by the polymerization or curing step, as previously set forth. Thus operating, it would be possible in many cases to considerably simplify both the equipment and the polymerization or curing operation, while retaining the feature of allowing a ready coupling between the resin bar reinforced with fibers and the external covering of strictly required size to ensure a correct impregnation of the gap between said two parts.

From the foregoing it will be apparent that according to the present invention a method has been provided for producing insulators, method affording technical advantages relating to less problems in construction and greater reliabilities that the insulator can provide due to the presence of a minimum thickness of glueing material between the resin bar and the external covering, as well as economical advantages relating to the smaller size of the covering as a function of the reduced internal size of said covering. Additionally, the method and insulator according to the invention afford further economical advantages for the less amount of glueing resin being required, at the same time rendering the insulators more functional under the operating conditions, particularly under the conditions where such changes would occur, as changes of cyclic thermal character in low and high frequency, as well as mechanical changes of the same character.

What is claimed is:

1. A method for making insulators including a resin bar reinforced with fibers, provided with an external covering of electrically insulating material and terminal elements, comprising the steps of forming the bar from a fiber glass mass impregnated with a thermosetting resin; carrying out the complete polymerization or curing substantially for the major portion of the bar length, maintaining at least one end thereof cooled at a lower temperature than the complete polymerization or curing temperature for said resin; inserting the bar so formed in an insulating covering; applying a terminal element to said uncured end of the bar; widening the fiber glasses of the uncured end of the bar against a divergent or flared surface of the terminal, and carrying out a successive step of complete polymerization or curing for the resin at the end of said bar.

2. A method as set forth in claim 1, in which said bar has a constant section throughout its length, and both the ends are cooled at a lower temperature than the resin polymerization or curing temperature.

3. A method as claimed in claim 1, comprising the step of forming said bar with an end having a conical divergent surface; the other end of the bar being formed with a same constant section as the bar and being maintained at a lower temperature than the resin polymerization or curing temperature.

4. A method according to a continuous cycle for producing bars to provide insulators according to the process as set forth in claim 1, comprising the steps of: unwinding a continuous fiber web; impregnating it with a thermosetting resin; heating it to a resin gelling temperature; drawing it to provide a continuous constant section bar; heating it to a polymerization or curing temperature, lengths of spaced apart bars being maintained cooled; and cutting the bar to lengths at said uncured and cooled sections.

5. A method as set forth in claim 1, further characterized by impregnating the gap between said bar and the inner surface of said covering with a hardenable bonding and filling material.

* * * * *